Figure 1:
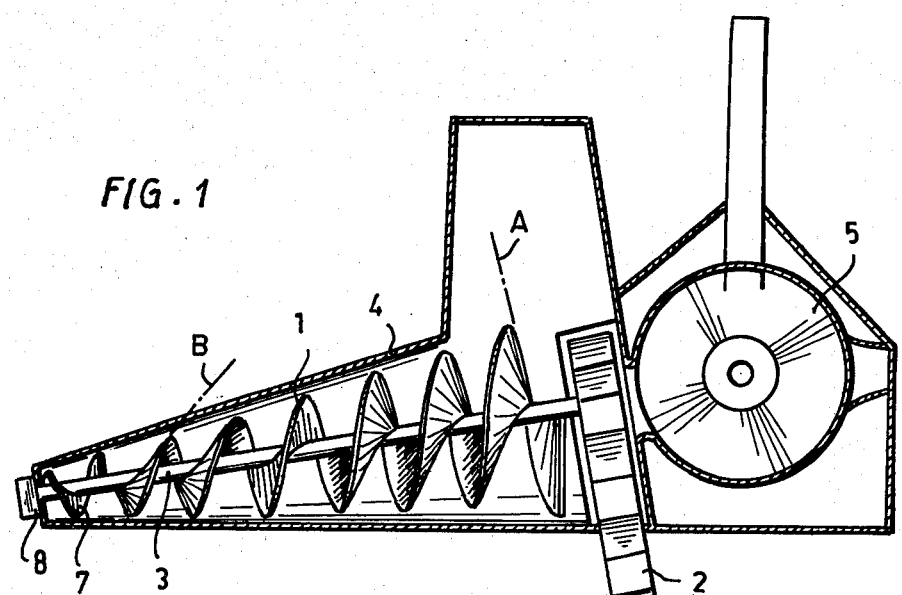

United States Patent [19]

Korte

[11] Patent Number: 4,468,872
[45] Date of Patent: Sep. 4, 1984

[54] PEAT MACHINE

[75] Inventor: Gunnar Korte, Ylivieska, Finland

[73] Assignee: Kortteen Konepaja G. Korte & Kni, Ylivieska, Finland

[21] Appl. No.: 466,734

[22] Filed: Feb. 16, 1983

[30] Foreign Application Priority Data

Mar. 17, 1982 [FI] Finland .................................. 820920

[51] Int. Cl.³ ............................................. E21C 49/00
[52] U.S. Cl. .............................................. 37/3; 44/28; 366/323; 425/208
[58] Field of Search .............. 37/3; 425/208; 366/323, 366/88; 44/27-32

[56] References Cited

U.S. PATENT DOCUMENTS

| | | | |
|---|---|---|---|
| 216,958 | 7/1879 | Hudson | 366/323 X |
| 766,260 | 8/1904 | Jaques | 425/208 |
| 1,055,475 | 3/1913 | Koolman et al. | 366/323 X |
| 1,486,141 | 3/1924 | Hindshaw | 44/27 |
| 3,317,959 | 5/1967 | List | 425/208 |
| 3,323,570 | 6/1967 | Tullock et al. | 366/323 X |
| 4,192,088 | 3/1980 | Saalasti | 37/3 |

FOREIGN PATENT DOCUMENTS

| | | | |
|---|---|---|---|
| 49370 | 10/1934 | Denmark | 44/30 |
| 159401 | 7/1957 | Sweden | 37/3 |
| 198990 | 10/1965 | Sweden | 37/3 |
| 764365 | 12/1956 | United Kingdom | 37/3 |

Primary Examiner—Clifford D. Crowder
Attorney, Agent, or Firm—Kenyon & Kenyon

[57] ABSTRACT

The present invention relates to a peat machine for connection to a tractor or a corresponding power source. The piece peat machine is provided with a digging means for digging peat and a pressure screw for digged peat. In order to improve the production capacity and to reduce the power demand, the pressure screw is conically shaped so that its diameter diminishes towards the outlet nozzles. In addition, the thread of the pressure screw is, at the end facing the digging means, substantially at right angles to the shaft of the screw or inclined forwards towards the outlet nozzles. At the outlet nozzles, the thread is inclined backwards towards the digging means.

3 Claims, 2 Drawing Figures

PEAT MACHINE

The present invention relates to a peat machine for connection to a tractor or a corresponding power source comprising a digging means for digging peat and a pressure screw for dug peat which is conically shaped so that its diameter diminishes towards outlet nozzles for the dug peat.

Peat machines of this type are well-known in the art. These known devices suffer from the disadvantage of poor production capacity as compared to the power used. If a tractor of more than 100 h.p. is used, a peat amount of 25 m$^3$/h obtained can be considered to be a typical value. The poor production capacity is due to a complicated construction, in which the losses are great. The straight pressure screws used in the known constructions also produce high resistance in the outlet end resulting in a correspondingly high power demand. As an example of the complexity of the construction one might mention that the digging disc or the digging chain and the straight pressure screw are positioned on different shafts. This arrangement is due to the fact that the crevice to be made in peat digging must not be made perpendicular but instead inclined because only in this way is it possible to ensure that the parts remaining between the crevices fall in the same direction so that no undesirable ditches are formed. Such a construction using a plurality of rotating shafts is not economical in operation and, in addition, manufacturing costs will be relatively high, mainly due to various transmission means. Such transmission means (gear wheels, etc.) cause high power losses, especially if the rotary speeds are high. It has, however, been necessary to use in the known devices relatively high rotary speeds because the digging capacity of the digging chain or disc is high as compared to the capacity of the screw. However, it has not been possible to provide the pressure screw with a large diameter, in which case it would be efficient, because pressure is produced in one end of the screw which substantially increases the power demand. Nor has the use of low rotary speeds in known devices been successful because, i.e. the peat mass has got stuck in the screw. Thus the rotary speed of known devices has always been a compromise whereby a good result has not been achieved in the digging capacity.

Strictly speaking, the invention is characterized in that the thread of the pressure screw, at the end facing the digging means, is substantially at right angles to the shaft of the screw or inclined forwards towards the outlet nozzles, and in that the thread at the outlet nozzles is inclined backwards towards the digging means.

The advantage of the invention is above all to be seen in the increased production capacity; a peat quantity of 100 m$^3$/h obtained can be considered as a typical value if a 100 h.p. tractor is used. The construction is extremely simple because all rotating parts are located on the same shaft whereby losses are small and the manufacturing costs low.

In another embodiment of the invention a peat machine is provided in which a pressure screw and a digging means are arranged on the same shaft.

In yet another embodiment of the invention, a peat machine with a pressure screw is provided in which at the narrower end of the pressure screw is arranged a thread portion in which the pitch is reversed as compared to the remaining thread portion of the pressure screw.

Figure 2:
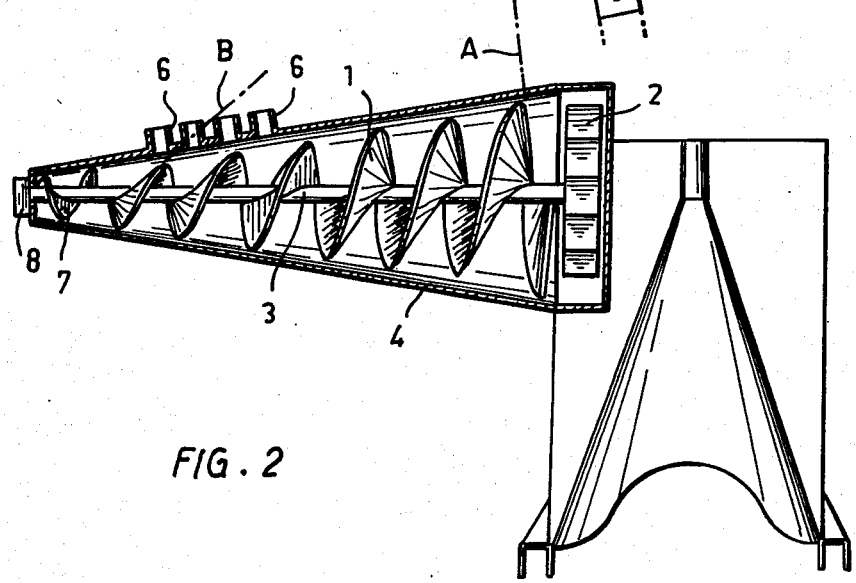

In the following, the invention will be described in more detail by means of an embodiment shown in the accompanying drawings, in which FIG. 1 is a front view, partly in section, of a device according to the invention, and FIG. 2 is a top view, partly in section, of the device according to FIG. 1.

In the Figures, a conical pressure screw is denoted by reference numeral 1. A digging means (digging chain) is denoted by numeral 2. The shaft of the pressure screw, around which the digging chain 2 is also arranged to rotate, is denoted by numeral 3. The device is enclosed in a normal manner in a protective casing 4.

The device shown in the Figures can in a manner known per se be connected to a tractor or a corresponding power source (not shown). The driving power is transmitted from the power outlet of the tractor via an angle transmission 5 to the pressure screw 1.

The conical shape of the pressure screw has made it possible to arrange all rotating parts on one shaft, while at the same time meeting the absolute requirement that the crevice to be made in the ground must be inclined. This means that the digging chain must rotate in an inclined position with respect to the surface of the ground. This is especially clearly seen in FIG. 1, in which the upper end of the digging chain illustrated in principle is shown. The lower end of the chain (not shown) cuts the peat off and lifts it to the casing 4. The operation of the digging chain is a known technique. Thus, by means of the construction according to the invention the required operating position is achieved by means of an extremely simple construction.

The thread of the conical pressure screw 1 is, according to the invention, formed so that the thread at the end facing the digging chain 2 is substantially at right angles to the shaft 3 of the screw or inclined forwards towards the outlet nozzles 6. By this is meant that the thread portion of the screw forms an angle of 90° or less with the shaft of the screw when measured from the side of said part facing the tip of the cone (the narrower end). At the outlet nozzles 6, the thread is, in the construction according to the invention, formed so as to be inclined backwards towards the digging chain. By this is meant that the thread portion forms an acute angle with the shaft of the screw as measured from the side of said part facing the base part of the cone (the wider end). At the front end of the pressure screw the thread is thus collecting and at the rear end is a corresponding manner discharging. This prevents clogging of the screw, which in known devices has proved to be a difficult problem.

The conical pressure screw has the advantage that the number of revolutions can be reduced to a much lower value than in known devices whereby the power demand is reduced, as stated above. This is due to the fact that the front end of the screw, where no pressure prevails but which must collect a large mass quantity, is efficient because of its large size, while the rear end, where the mass is subjected to pressure in a small space, is small. Unnecessary losses occurring in the known devices are thereby avoided. The essential operation of the front end of the screw, i.e. the collection of peat mass, is moreover facilitated by said collecting thread shape. The discharge of material at the discharge end is in a corresponding manner facilitated as a result of the discharging thread shape, as described above.

The rear end of the pressure screw may, in addition, be provided with a thread portion 7 in which the pitch is reversed as compared to the remaining thread on the pressure screw. The object of this thread portion 7 is to guide out any tree roots or the like so as to prevent them from becoming twisted between the shaft 3 the bearing 8.

The invention is of course not in any way limited to the above mentioned embodiment but can naturally be modified in a number of different ways within the scope of the claims. Thus, the digging chain 2 may, for example, be replaced with, e.g., a digging disc or any other corresponding means.

What I claim is:

1. A peat machine for connection to a power source such as a tractor, said peat machine comprising a digging means for digging peat and a pressure screw disposed so as to move peat dug by said digging means, the pressure screw having a shaft and a thread extending about said shaft, said thread being conically shaped so that its diameter diminishes in a direction away from said digging means, the inclination of said thread with said shaft decreasing along a direction away from said digging means, the angle of inclination of said thread relative to said shaft at a first location adjacent said digging means being at least 90° and the angle of inclination of said thread relative to said shaft at a second location spaced downstream with respect to the movement of peat by said pressure screw from the first location being less than 90°, said angles being measured from the side of the thread facing the base of the cone.

2. A peat machine according to claim 1, wherein said pressure screw and said digging means are arranged on the same shaft.

3. A peat machine according to claim 1 wherein at the narrower end of said pressure screw is arranged a thread portion in which the pitch is reversed as compared to the remaining thread portion of said pressure screw.

* * * * *